United States Patent [19]
Kaercher, Jr.

[11] 3,914,948
[45] Oct. 28, 1975

[54] MACHINE FOR BURYING AN ELONGATED FLEXIBLE ELEMENT OF INDEFINITE LENGTH UTILIZING CONTRA-OSCILLATORY BLADES

[75] Inventor: William C. Kaercher, Jr., Minneapolis, Minn.

[73] Assignee: Jacobsen Manufacturing Company, Racine, Wis.

[22] Filed: May 7, 1974

[21] Appl. No.: 467,627

[52] U.S. Cl. ................... 61/72.6; 37/193; 172/40
[51] Int. Cl.$^2$... F16L 1/00; A01B 35/00; E02F 5/02
[58] Field of Search................... 61/72.6, 72.7, 72.5; 172/40, 699; 37/193

[56] References Cited
UNITED STATES PATENTS

| | | | |
|---|---|---|---|
| 3,685,591 | 8/1972 | Ulrich et al. | 61/72.6 X |
| 3,789,614 | 2/1974 | Rogers | 61/72.6 |

FOREIGN PATENTS OR APPLICATIONS

| | | | |
|---|---|---|---|
| 1,189,602 | 3/1965 | Germany | 172/40 |

Primary Examiner—Jacob Shapiro
Attorney, Agent, or Firm—Stuart R. Peterson

[57] ABSTRACT

A self-propelled machine has a pair of arms pivotally mounted at their upper ends and eccentric means for contra-oscillating these arms forwardly and rearwardly as the machine traverses the ground. A leading blade is attached to the lower end of the more forward arm and a trailing blade is attached to the lower end of the more rearward arm. The eccentric means oscillates the arms, advancing the leading blade forwardly and the trailing blade rearwardly and vice versa. The leading blade is shorter than the trailing blade so that the full depth of the trench or slot is incrementally cut, the shorter or leading blade first cutting to a predetermined depth and then the longer or trailing blade cutting from that depth to the full depth determined by the length of the trailing blade. In one embodiment, a conical tunnel forming member is carried at the lower end of the trailing blade and to this tunnel forming member is attached the device that actually pulls the element to be buried. In a second embodiment, a feed device is oscillated behind the trailing blade, feeding the elongated element, more specifically a wire in this instance, into the trench or slot formed by the leading and trailing blades.

16 Claims, 7 Drawing Figures

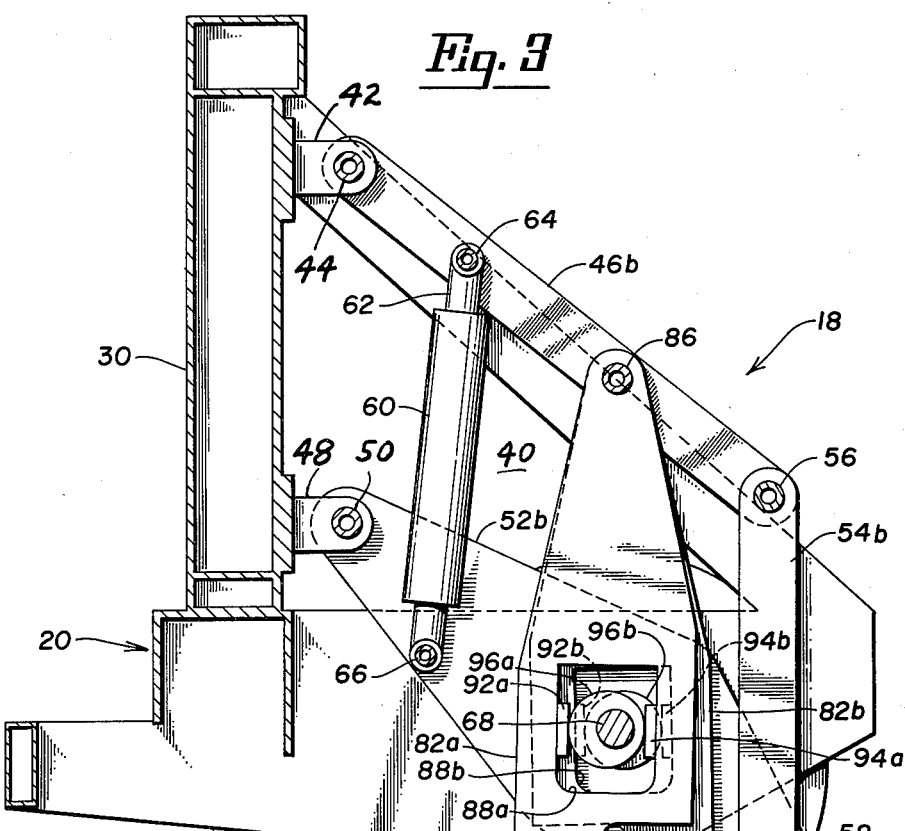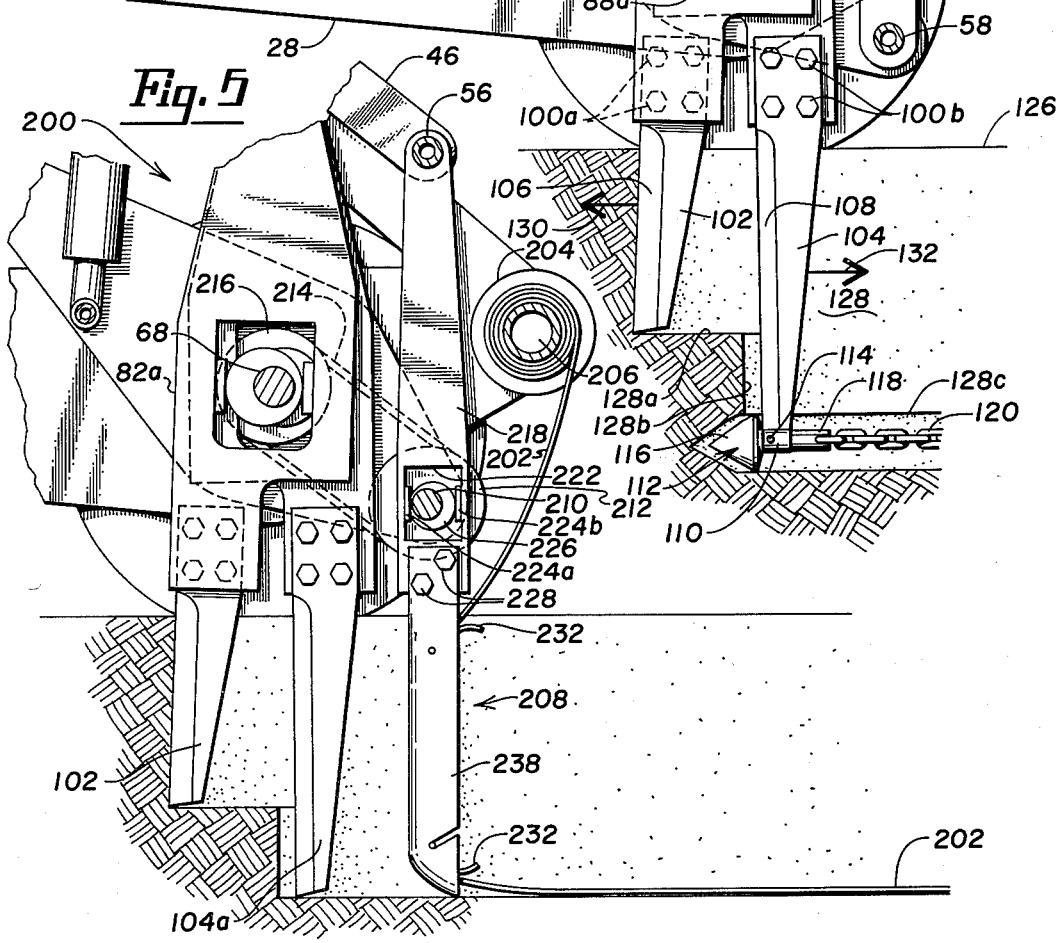

MACHINE FOR BURYING AN ELONGATED FLEXIBLE ELEMENT OF INDEFINITE LENGTH UTILIZING CONTRA-OSCILLATORY BLADES

BACKGROUND OF THE INVENTION

1. Field of the Invention

This invention relates generally to apparatus for embedding elongated flexible elements of indefinite length beneath the ground, and especially pertains to a machine in which there are two trench-cutting blades that are asynchronously oscillated, more precisely in a contra or 180° out-of-phase relationship.

2. Description of the Prior Art

Various machines have been devised in the past for burying flexible elements, such as flexible tubing, piping, wire or cable that involve oscillatory motion. One such machine is disclosed in U.S. Pat. No. 3,201,944, issued on Aug. 24, 1965 to Peter N. Christianson which is titled "PIPE AND CABLE LAYING MACHINE". While this machine has functioned admirably for its intended purpose, nonetheless it has been restricted to relatively shallow trench depths.

The same has been true for two of my own machines which are illustrated in U.S. Pat. No. 3,363,424, granted Jan. 16, 1968 for "MACHINE FOR BURYING FLEXIBLE PIPES AND THE LIKE" and my U.S. Pat. No. 3,371,495, granted Mar. 5, 1968 for "CONDUIT EMBEDDING MACHINE". In each of the alluded to machines, a single oscillatory blade is employed for cutting the trench or slot.

While this type of machine is far superior to a static-type blade, that is, one that does not oscillate, still the use of a single blade restricts the cutting of the trench or slot to a rather shallow depth. In various installations pipe and cable must be buried at greater depths, the prior art machines that employ but a single oscillatory blade proving ineffectual for a number of reasons. Attempts have been made to increase the size of such machines, but this has necessitated the use of rather massive and cumbersome equipment which not only is more expensive to manufacture but is less maneuverable and has the decided objectionable feature of excessively vibrating the ground as the trench is being cut.

Therefore, either the inadequacies and shortcomings of the prior art oscillatory machines are reluctantly tolerated or conventional open trench mechanical diggers are resorted to, these latter machines involving additional investment, more time and far greater disfigurement of the terrain.

SUMMARY OF THE INVENTION

Accordingly, one object of the present invention is to minimize the objectionable features of the prior art machines. More specifically, an aim of the invention is to oscillate two blades out of synchronism. One blade is longer than the other so that the shorter of the two, which is the leading blade, performs its cutting action while the longer blade, which is the trailing one, is being retracted, the longer or trailing blade then advancing or swinging forwardly while the leading blade is being retracted or swinging rearwardly. In this way, the efficiency of a machine for a given size is substantially increased, a very important advantage. Stated somewhat differently, the so-called drawbar pull of the machine is appreciably lessened, thereby permitting the machine to be more compact, and yet provide the requisite tractive effort for cutting a trench of considerable depth. It is within the purview of the present invention to cut a trench on the order of 18 inches or so in contradistinction to 12 inches.

Briefly, my invention utilizes asynchronously oscillated blades, more specifically two contra-oscillating blades, one being driven forwardly as the other is retracted, and then the other forwardly while the first one is retracted. By having the forward or leading blade shorter and somewhat thicker than the rearward or trailing blade, the trench is cut in two increments by reason of the shorter blade initially cutting the trench to a depth and width determined by its length and greater thickness, the upper portion of the trailing blade then moving through the trench formed by the leading blade and at the same time cutting the trench deeper, determined by its extra length. It is planned to have the relative lengths selected largely by reason of the power provided by the machine and also in accordance with the soil conditions that are to be encountered. The greater width of the leading blade is also influenced by the type of soil, for somewhat sandy soil is more apt to "close" in, requiring a blade width such that the trench remains sufficiently "open" for the passage of the upper portion of the trailing blade. In one embodiment of the invention, the elongated element to be buried is connected to the trailing blade so that it is pulled into the ground by reason of a tunnel forming member carried at the lower end of the trailing blade. In a second embodiment, it is contemplated that both the leading and trailing blades be relatively thick and devoid of any tunnel forming member, there being a rearwardly disposed wire feeding device that feeds the wire from a reel into the trench formed by the two forwardly disposed blades that are oscillated in a contra-oscillatory fashion.

BRIEF DESCRIPTION OF THE DRAWINGS

FIG. 3 is a sectional view taken generally in the direction of line 3—3 of FIG. 2, the leading blade being at the end of its forward swing and the trailing blade at the end of its rearward swing as in FIG. 1;

FIG. 5 is a view of another embodiment, the view corresponding generally to FIG. 3 but illustrating the use of a wire feeding device instead of the tunnel forming device;

DESCRIPTION OF THE PREFERRED EMBODIMENT

Figure 1:
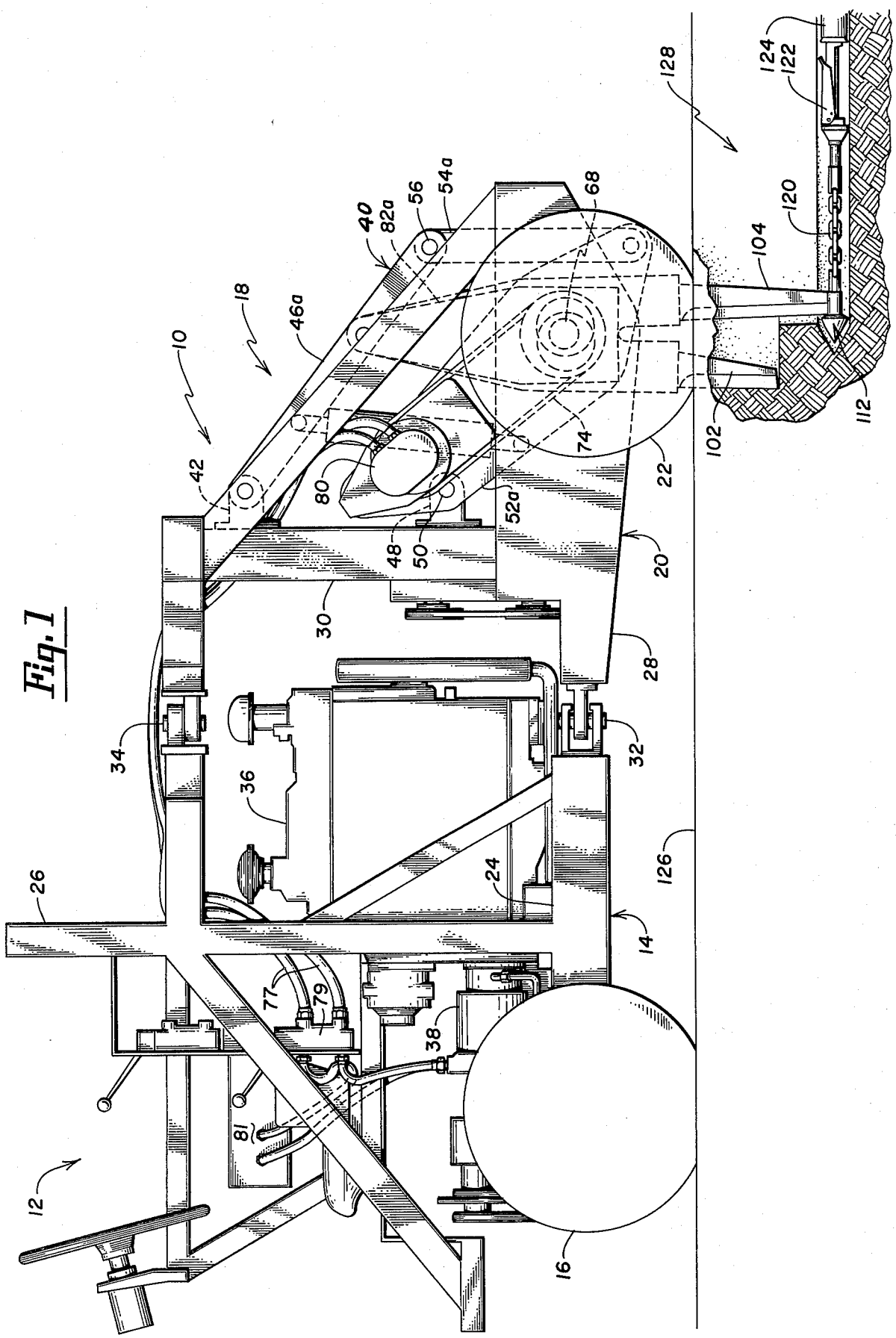
FIG. 1 is a side elevational view of one embodiment of my invention, a portion of the ground being shown in section in order to expose to view the two contra-oscillatory blades.

Referring first to FIG. 1, the machine exemplifying my invention has been denoted generally by the reference numeral 10. The machine 10 includes a tractor 12 having a chassis 14 with front drive wheels 16 which are at opposite ends of an axle mounted for rocking movement about a longitudinal axis. The machine 10 additionally includes a trailer 18 having a chassis 20 provided with rear drive wheels 22. The chassis 14 comprises a lower bed frame unit 24 to which the drive wheels 16 are attached and extending upwardly from the lower frame unit 24 is an upstanding frame unit 26. Somewhat similarly, the chassis 20 comprises a lower bed frame unit 28 to which the wheels 22 are attached and an upstanding frame unit 30. A lower swivel 32 and an upper swivel 34 pivotally couple the chassis 14 and 20 together. Stated somewhat differently, the machine 10 is of an articulated construction owing to the swivels 32, 34 which are vertically aligned one above the other.

It will be observed that the tractor 12 has an internal combustion engine 36 mounted thereon. Although in actual practice six pumps are employed, all driven by the engine 36, for the sake of discussion it can be assumed that a single pump 38 is driven by the engine 36. More will be said hereinafter concerning the hydraulic circuitry involved in the operation of the machine 10, including generally the propelling thereof, although such circuitry really does not constitute part of my invention.

Figure 2:
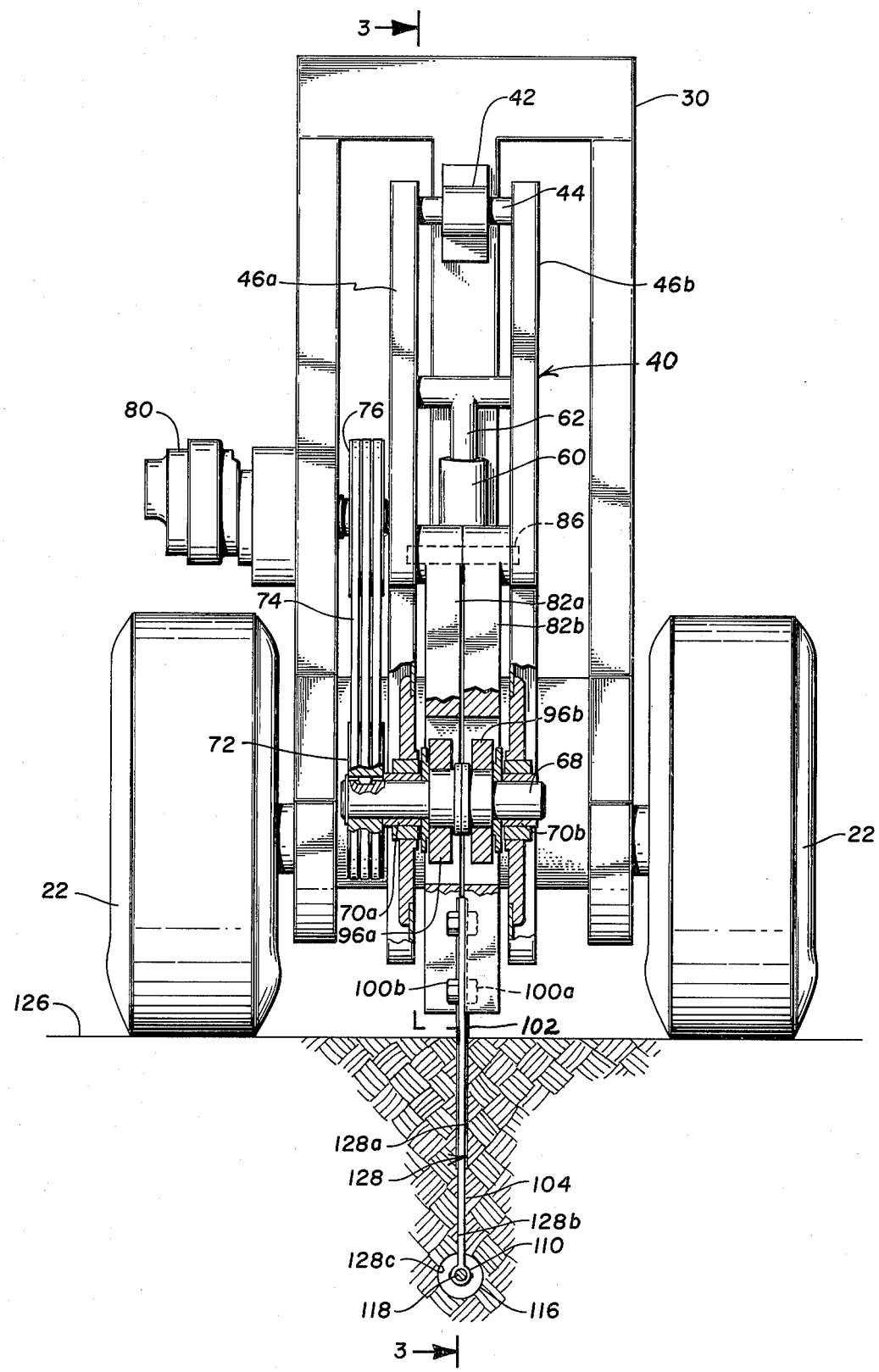
FIG. 2 is a rear view of the machine depicted in FIG. 1, a portion of the machine being broken away so as to reveal the two eccentrics that provide the contra-oscillatory motion.

At this time attention is called to a parallelogram lift structure or mechanism 40 carried on the trailer 18. As can be discerned from FIGS. 1 and 2, there is an upper bearing 42 secured to the upstanding frame unit 30. Journaled in the bearing 42 is a transverse pin 44. Sloping downwardly from the pin 44 is a pair of links 46, one such link being designated by the numeral 46a and the other by the numeral 46b, the link 46a appearing in FIG. 1, the link 46b appearing in FIG. 3, and both of these links 46a, and 46b appearing in FIG. 2. A lower bearing 48, which is similar to the upper bearing 42, is also attached to the upstanding frame unit 30. There is a transverse pin 50 that is journaled in the bearing 48. A pair of lower links 52a, 52b have one end thereof attached to the pin 50. The parallelogram configuration of the lift mechanism 40 is completed by reason of a pair of vertical links 54, the one denoted by the reference numeral 54a appearing in FIG. 1 and the other link 54b in FIG. 3. The links 54 are pivotally connected to the free ends of the links 46 and 52 by means of pins 56 and 58.

Still further, the lift mechanism 40 includes a hydraulic cylinder 60 having a piston rod 62 projecting upwardly therefrom. A pin 64 connects the upper end of the piston rod 62 to the previously mentioned upper links 46, actually 46a and 46b. The closed or lower end of the cylinder 60 is pivotally attached to the bed frame unit 28. When hydraulic fluid is delivered to the closed end of the cylinder 60, then the entire structure 40 is swung upwardly about the pins 44 and 50. The reason for this will be better understood hereinafter, although it will be understood that the fluid is supplied by the pump 38 via suitable controls (not shown).

Playing an important role in the practicing of the invention is a camshaft 68 that is journaled in bearings 70a, 70b mounted in the lower links 52a, 52b (FIG. 2), the shaft 68 having mounted at one end thereof a driven pulley 72. By means of flexible belts 74 that are entrained about the pulley 72 and a drive pulley 76, a drive shaft 78 which is rotated by hydraulic motor 80 functions to rotate the shaft 68 in the bearings 70. Various hydraulic lines 77 connect the hydraulic motor 80 in circuit with a control valve 79, a reservoir 81 and the pump 38. There are also valves for controlling the hydraulic fluid flow.

Also playing an important part in the invention are a pair of rotatable arms 82a, and 82b having a common pivot pin 86 at the upper ends thereof, the ends of which pin 86 is received in the upper links 46.

Figure 4:
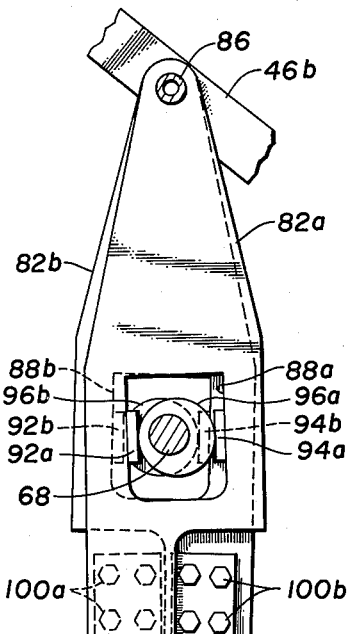
FIG. 4 is a simplified view corresponding to FIG. 3 but with the leading blade at the end of its rearward swing and the trailing blade at the end of its forward swing.

From FIG. 3 it will be observed that the arm 82a has a rectangular opening 88a formed therein, and the arm 82b has a rectangular opening 88b formed therein. In FIG. 3 (and also in FIG. 4) these openings 88a, 88b are angularly displaced relative to each other, this being due to the extreme angular positions of the oscillating arms 82a, 82b which are actually at opposite ends of their swinging travel in these two views (FIGS. 3 and 4). More specifically, FIG. 3 illustrates the arm 82a at the most forward end of its angular advancement or oscillatory travel with the arm 82b at its most rearward position, whereas FIG. 4 illustrates the arm 82a at the rear end of its travel and the arm 82b at the forward end of its stroke. Integral with the forward and rear sides of the opening 88a are cam blocks 92a, 94a. Similarly, there are cam blocks 92b, and 94b integral with the forward and rearward sides of the opening 88b.

As is believed evident from FIGS. 3 and 4, the shaft 68 has mounted thereon two cam or eccentric units 96a and 96b. Close inspection of FIGS. 3 and 4 will reveal that these eccentrics 96a and 96b are fixed to the shaft 68 so that they are 180° out of phase with each other. In other words, the eccentric unit 96a has its greatest eccentricity extending forwardly at the 9 o'clock position, whereas the eccentric 96a has its most eccentric portion extending rearwardly at the 3 o'clock position.

The horizontal orientation just alluded to appears best in FIGS. 3 and 4, although it also can be seen in phantom outline in FIG. 1. Thus, it will be recognized that the arm 82a has moved forwardly in FIGS. 1, 2 and 3 the full angular distance or stroke that it swings through. By the same token, the arm 82b has moved rearwardly from its rearmost position. In other words, the eccentric 96a has its greatest eccentricity at the 9 o'clock position, whereas the eccentric 96b, being 180° out-of-phase with the eccentric 96a, has its greatest eccentricity at the 3 o'clock position. In FIG. 4, however, the arm 82a has moved to its most rearward position, the eccentric 96a having its greatest eccentricity at the 3 o'clock position, while the arm 82b has advanced forwardly to the full extent of its forward stroke, the eccentric 96b now having its greatest eccentricity at the 9 o'clock position. For the sake of drafting simplicity, the roller bearing races usually employed for eccentrics have not been illustrated.

It will be noted that a plurality of bolts 100a extend through the arm 82a at its lower end, and a similar number of bolts 100b through the arm 82b at its lower end. Through the agency of these bolts a relatively short blade 102 is attached to the lower end of the arm 82a. A relatively long blade 104 is attached by means of the bolts 100b to the lower end of the other arm 82b. Close inspection of FIG. 2 will reveal that the blade 102 is somewhat thicker than the blade 104, the reason for which will become clearer hereinafter. The blade 102 has a forwardly directed knife edge 106, and the blade 104 has a forwardly directed knife edge 108.

Not only is the blade 104 longer (and thinner) than the blade 102, but it has an integral sleeve 110 at its lower end which serves as a means for holding in place a mole or tunnel forming member 112, a pin 114 extending through the sleeve 110 and member 112 to retain it in a fixed relationship with the lower end of the blade 104. The mole or tunnel forming member 112 is provided with a forwardly pointing conical head 116 and a rearwardly extending cylindrical body 118.

To the cylindrical body 118 is attached the forward end of a chain 120. To the rear of the chain 120 is attached a pipe gripping device 122 (FIG. 1). The pipe gripping device is preferably of the type described in my U.S. Pat. No. 3,758,146, granted Sept. 11, 1973 for "GRIPPING DEVICE FOR USE IN EMBEDDING PIPES AND TUBES" although it may be of the so-called braided Chinese finger type. The rear end of the device 122 is received within the forward end of a flexible pipe or tube 124 (FIG. 1), there being an expansible collet (concealed in the pipe or tube 124) that is part of the device 122 and which expands within the forward end of the pipe or tube 124 so as to enable the pipe or tube to be pulled forwardly.

The machine 10 is designed to traverse the surface of the ground. The grade or ground level has been assigned the reference numeral 126. As far as the trench or slot being formed in FIGS. 1–4 is concerned, the complete trench or slot has been given the reference numeral 128. More specifically, it will be noted that the trench or slot increment cut by the leading blade 102 has been assigned the reference numeral 128a. The added trench depth contributed by the trailing blade 104 has been assigned the reference numeral 128b. The tunnel formed by the conical head 116 has been given the reference numeral 128c. It is the tunnel portion 128c that accommodates therein the pipe or tube 124 that is being buried.

Whereas the machine 10 of FIGS. 1–4 is laying a pipe or tube 124, it is planned that the machine shown only fragmentarily in FIG. 5 and carrying the reference numeral 200 is designed to lay a wire 202. In this regard, a reel 204 rotatably mounted on a shaft 206 carries a supply of the wire 202.

The wire feed device itself has been designated generally by the reference numeral 208. It will be perceived that there is a camshaft 210 journaled in bearings contained in the lower links 52 in much the same fashion as the shaft 68 is journaled in the bearings 70. The bearings for the shaft 210 have not been illustrated though. However, a driven pulley 212 is affixed to one end of the shaft 210 and by means of a flexible belt 214 the pulley 212 is driven from a drive pulley 216 mounted on the shaft 68.

A third oscillatory arm 218 utilizes the pivot pin 56 at the upper end thereof for pivotally mounting this arm for swinging movement, the pin 56 extending through the rear end of the links 46, as already explained. Here again, a rectangular opening 222 is provided. Within the opening 222 are cam blocks 224a, 224b. Rotatable between the forwardly and rearwardly disposed cam blocks 224a, 224b is an eccentric 226 that is affixed to the shaft 210. At the lower end of the oscillatory arm 218 are bolts 228 that secure the upper end of a chute 238 thereto. A wire guide 232 is positioned within the chute 238 and functions to guide the previously mentioned wire 202 from its vertical position into the horizontal position as indicated in FIG. 5. The chute 238 is more fully described in my U.S. Pat. No. 3,757,529, issued on Sept. 11, 1973 for "WIRE AND TAPE LAYING MACHINE EMPLOYING OSCILLATORY TRENCHING BLADE AND OSCILLATORY FEEDING DEVICE".

When using the machine 200 it is readily apparent that the mole or tunnel forming member 112 is not needed, and indeed is not wanted because it would only increase the drag when laying the relatively thin wire 202. Accordingly, the trailing blade 104a has no sleeve 110. Consequently, both the blades 102, 104a in FIG. 5 perform only a cutting or slicing action without forming a tunnel as results when using the machine 10 of FIGS. 1–4. As in the machine 10 of FIGS. 1–4, however, the leading blade 102 is somewhat thicker than the trailing blade 104a in the embodiment 200 of FIG. 5 now under discussion.

As far as both embodiments 10 and 200 are concerned, it is preferable that the machine in each instance be hydraulically propelled. While other arrangements are practical, the drive wheels 16 are powered through a differential by a hydraulic motor and likewise the drive wheels 22 are rotated through a second differential powered by another hydraulic motor, the two drive motors being hooked in series and receiving fluid under pressure from the pump 38, actually a special pump (one of six) driven by the engine 36. It has already been mentioned that the hydraulic circuitry is not part of my invention, although it certainly performs an important supporting role in practice.

Figure 6:
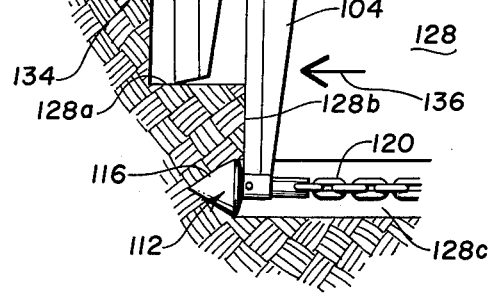
FIG. 6 is a view of a modified trailing blade, the blade differing from the one appearing in FIG. 3 by reason of the blade being sufficiently thick to accommodate the tunnel forming device therein.
Figure 7:
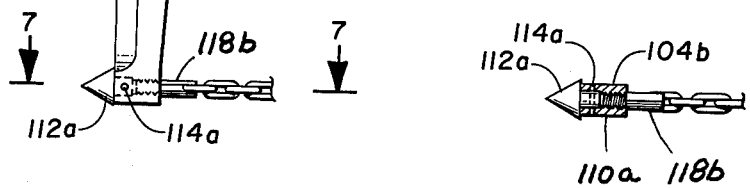
FIG. 7 is a horizontal sectional view taken in the direction of line 6—6 of FIG. 6.

Turning briefly to FIGS. 6 and 7, a blade 104b has been pictured. This blade 104b differs from the blade 104 of FIGS. 1–4 by virtue of being thicker. In this instance the blade 104b is sufficiently thick to accommodate a tunnel forming member 112a in its lower end portion rather than in the special sleeve 110 added to the lower end of the blade 104. The forward portion of a passage 110a is untapped to receive therein the cylindrical body 118a, a transverse pin 114a extending through the body 118a to hold the member in place at the front. A plug member 118b has a forward end threadedly engaged with the rear or tapped portion of the passage 110a, the chain 120 being attached to this member 118b in the same way that the chain 120 is attached to the cylindrical body 118 in FIGS. 1–4. Thus, the arrangement shown in FIGS. 6 and 7 can be used to pull an elongated member, such as the pipe or tube 124, or the tunnel forming member 112a and plug member 118b can be removed to permit the blade 104b to be used in the manner the blade 104a of FIG. 5 is employed, that is with the wire feed device 208.

OPERATION

Before presenting an operational sequence for the machines 10 and 200, it might be well to point out that the specific, and even the relative, lengths of the blades 102, 104 and 102, 104a (also 104b), as well as the difference in their thicknesses, are susceptible to variation depending to a large extent upon the type of burying to be performed. Factors normally to be considered would be the configuration of the elongated element to be buried, the soil conditions apt to be encountered, physical limitations on machine size and weight, and the like. As a general guide, however, it is contemplated that the leading blade 102 in both instances be approximately 12 inches long and the trailing blade 104 or 104a approximately 18 inches long. As far as the machine 10 is concerned the tunnel forming member 112 increases the drag on the blade 104. Usually the soil becomes more compact at the lower depths, too. This latter consideration suggests the same length for the blade 104a as for the blade 104. Consequently, a rule of thumb would be that the leading blade 102 be roughly two-thirds the length of the trailing blade 104 or 104a.

As for blade thickness, the blade 102 should be on the order of ½ inch whereas the blade 104 would be approximately ⅝ inch thick. The blade 102 in FIG. 5, while looking like that of FIGS. 1–4, should be somewhat thicker, preferably about 1¼ inch, whereas the blade 104a would be approximately 1 inch thick; the blade 104b can be about the same as the blade 104a.

In operating the machine 10, the hydraulic cylinder or ram 60 would initially elevate the lift mechanism 40. This raises the blade 104 and its sleeve 110 above the ground level 126 so that the pipe or tube 124 can be fastened to the trailing blade 104 via the chain 120 and gripping device 122.

Assuming that the machine 10 is at the fringe of the area where the flexible element 124 is to be buried, the operator then manipulates the appropriate control lever to feed fluid from the pump 38 to the hydraulic motor 80. This causes the shaft 68 to be rotated. Such action in turn rotates the eccentrics 96a and 96b which oscillate the arms 82a and 82b, and also the blades 102, 104, the eccentrics do so via the cam blocks 92 and 94. The operator then puts the machine 10 in motion, this being done by feeding fluid to the two hydraulic motors (not shown) serially connected to the differentials for the four drive wheels 16 and 22. At the same time, he retracts the piston rod 62 into the cylinder 60, using the appropriate control lever to do so, to lower the lift mechanism 40. In this way, the tunnel forming member 112 traverses an arcuate path into the ground 126, the blades 102, 104 quickly reaching the various trench cutting correlations appearing in FIGS. 1, 3 and 4.

Because it is exceedingly important to understand the contra-oscillatory or 180° phase relationship derived from a practicing of my invention, directional arrows 130, 132, 134 and 136 have been applied to FIGS. 3 and 4. Arrow 130 indicates that the leading blade 102 has advanced in the direction of this arrow to the position it assumes in FIG. 3. Since the eccentrics 96a and 96b are diametrically oriented on the shaft 68 as far as their maximum eccentricities are concerned, the arrow 132 indicates the simultaneous rearward directional movement of the trailing blade 104 that has taken place during the interval that the leading blade 82a has been moving forwardly. The arrow 134 signifies the most rearward swing of the leading blade 102, whereas the arrow 136 indicates the most forward stroke position of the trailing blade 82b. Explained somewhat differently, the arrows 130, 134 denote the out-of-phase advancing or cutting strokes of the leading and trailing blades 82a, 82b, respectively, first the blade 82a cutting to the depth indicated at 128a and then the blade 82b cutting to the full depth indicated by the numeral 128b, actually to the bottom of the tunnel 128c. The arrows 132 and 136 merely represent out-of-phase (more specifically 180°) non-cutting return swings or strokes.

There are two points that should be understood at this stage. The first one has already been briefly touched upon. This is the relative thickness of the leading and trailing blades 102 and 104, 102 and 104a, 104b, the leading blade being thicker in order to not shoulder the trailing one with any more cutting resistance than it is intended to share with the leading one. In this regard, there will always be some filling in or "closing" of the incremental trench 128a. If the leading and trailing blades were the same thickness, then the longer trailing blade would have to "re-open" part of the trench 128a cut by the shorter leading blade. This condition becomes more pronounced in loose or sandy soil, but nonetheless can become a factor if a balanced cutting load is to be maintained, which is of course preferable when an 180° out-of-phase relationship is involved, for then the engine 36 supplies power at a truly constant rate. An exact balance is not necessary, and indeed would be difficult to realize at all times, because soil conditions can vary considerably in just one pass or traverse of a field or yard. However, it is a goal to be sought. In any event, even when there is an unbalance, the asynchronous, preferably a contra or 180° out-of-phase relationship, is vastly superior to the single oscillatory blade arrangement constituting the closest known prior art.

The second point to be understood at this time is that the throw or eccentricity of the eccentrics 96a, 96b does not have to be the same. Owing to the greater depth of the trailing blade 104 and the greater distance the lower end thereof is from the common pivot pin 86, the eccentricity of the eccentric 96b could be reduced to the extent that the horizontal travel or advancement of the lower ends of the leading and trailing blades 102, 104, respectively, are equal. As with the relative lengths of the leading and trailing blades, the eccentricity is also influenced by the specific soil conditions and other operating factors that can better be taken care of, when of sufficient import, by the user or by the factory when apprised of unduly severe deviations from normal or average soil conditions.

Since the machine 10 is continually moving forwardly, it is difficult to portray exactly what transpires. There are two forward components to be considered: (1) that from the movement of the machine 10 relative to the ground 126, and (2) that from the eccentric 96a which is in FIG. 3 causing the leading blade 102 to advance. For the sake of a facile discussion, it might be well to consider the machine 10 as momentarily motionless in FIGS. 3 and 4, such a condition more accurately illustrating the action of the contra-oscillating blades 102, 104. In any event, it should be obvious that during one time interval the blade 102 is cutting and during the next equal time interval the blade 104 is cutting. Consequently, there is always a cutting operation being performed, thereby making a more efficient use of the power supplied by the engine 36 and also a smoother cutting operation in that the impact cutting loads are shared virtually equally by the two blades 102, 104, a precise equal sharing depending on soil conditions, relative blade lengths, the type of element being buried which are several factors hereinbefore touched upon. Equality is in no way essential, as already mentioned, for a radical improvement is realized over the pounding, jarring and severe vibration, resulting from the use of only a single oscillatory blade, as in the prior art with which I am acquainted. The corresponding improvement in power consumption should also be obvious.

When the desired length of pipe or tubing 124 has been buried, the operator then raises once again the mechanism 40, doing so while the machine 10 is still advancing. This causes the tunnel forming member 112 to work its way upwardly out of the ground 126.

Due to the thinness of the blades 102, 104, the trench 128 usually defies detection. Once again, soil conditions enter into the picture. Usually, the soil is sufficiently sandy so that the trench 128 closes itself. Where turf exists, the turf conceals any slit that might remain. Consequently, my invention results in a finished burying job that is far superior to hand dug or machine dug trenches where the trench is first open and then must be filled after the pipe, tubing, conduit or the like has been laid therein.

The operation of the machine 200 should be readily understood from the foregoing description. The action of the leading blade 102 and trailing blade 104a illustrated in FIG. 5 is the same as with the machine 10. However, the rotation of the shaft 68 by the hydraulic motor 80 causes the shaft 210 to rotate via the belt 214. The oscillatory drive imparted to the feed device 208 through the agency of the eccentric 226 on the shaft 210 is responsible for feeding the wire 202 in increments. The wire guide 232 acts against the particular section of wire contained in the chute 238 to pull another wire portion downwardly each time the device 208 moves forwardly, all as more fully explained in my aforesaid U.S. Pat. No. 3,757,529.

As with the machine 10, far superior utilization of power is realized with the machine 200 as contrasted with using only a single oscillatory blade as in the prior art. As with the blades 102, 104 of the machine 10, the blades 102, 104a cut in a progressive fashion, the leading blade 102 cutting a trench portion to a depth determined by its length, followed by the trailing blade deepening the trench to a depth determined by its length.

The blade 104b of FIGS. 6 and 7, when carrying the tunnel forming member 112a, operates or functions exactly as does the blade 104 and requires no special explanation. It is also believed that it is evident that when the members 112a and 118b are removed, then the blade 104b functions in the same manner as the blade 104a. The threaded portion of the passage 110a permits a blocking plug (not shown) to be substituted for the members 112a, 118b, thereby keeping the passage free of dirt so that the two types of burying (FIGS. 1–4 versus FIG. 5) can alternately be achieved without difficulty.

I claim:

1. A machine for burying an elongated element of indefinite length comprising wheeled frame means adapted to traverse the surface of the ground, a leading blade pivotally carried by said frame means and extending downwardly therefrom, a trailing blade also pivotally carried by said frame means and extending farther downwardly from said frame means than said leading blade, said trailing blade being in rearward alignment with said leading blade, and means for asynchronously oscillating said blades to cause said leading blade to swing forwardly and said trailing blade to swing rearwardly during at least a portion of the time said leading blade is swinging forwardly, and alternately to cause said trailing blade to swing forwardly and said leading blade to swing rearwardly during at least a portion of the time said trailing blade is swinging forwardly.

2. The machine defined in claim 1 in which said blades are oscillated so that said leading blade is moved forwardly relative the frame means only while said trailing blade is moved rearwardly and vice versa.

3. The machine defined in claim 1 in which said means for oscillating said blades includes a pair of eccentric members rotatable about a transverse axis and having substantially a 180° out-of-phase eccentricity.

4. The machine defined in claim 3 in which said means for oscillating said blades additionally includes a transverse drive shaft, said eccentric members being affixed to said drive shaft in a side-by-side relation.

5. A machine for burying an elongated element of indefinite length comprising wheeled frame means adapted to traverse the surface of the ground, a pair of arms pivotally mounted adjacent their upper ends to said frame means, each of said arms having forward and rearward cam surfaces intermediate their upper and lower ends, a drive shaft, a pair of eccentric members affixed to said drive shaft in a side-by-side relation, one of said eccentric members being between the cam surfaces of one of said arms and the other of said eccentric members being between the cam surfaces of the other of said arms, a leading blade attached to the lower end of one of said arms and extending downwardly therefrom, a trailing blade attached to the lower end of the other of said arms and extending downwardly therefrom farther from said frame means than said leading blade, and means for rotating said drive shaft to oscillate said arms and blades, said eccentric members having substantially a 180° out-of-phase relationship so that said leading blade is moved forwardly relative the frame means while said trailing blade is moved rearwardly and vice versa.

6. The machine defined in claim 5 including a tunnel forming member carried at its lower end of said trailing blade and means attached to said tunnel forming member for pulling said elongated element into the tunnel formed by said tunnel forming member.

7. The machine defined in claim 5 including means disposed rearwardly of said trailing blade for feeding said elongated element downwardly into the trench cut by said blades.

8. The machine defined in claim 7 including means for oscillating said feeding means.

9. The machine defined in claim 8 in which said means for oscillating said feeding means includes a second shaft, an eccentric member on said second shaft, a pulley on said second shaft, a pulley on said first shaft, and a flexible belt entrained over said pulleys.

10. The machine defined in claim 9 including a third arm pivotally mounted adjacent its upper end to said frame means, said third arm having forward and rearward cam surfaces intermediate its upper and lower ends between which said eccentric members rotate and said feeding means being attached to the lower end of said third arm.

11. A machine for burying an elongated flexible element comprising wheeled frame means, a pair of oscillatory arms pivotally supported on said frame means, a first blade extending downwardly from one of said arms, a second blade longer than said first blade extending downwardly from the other of said arms in an aligned trailing relation with said first blade, eccentric means for oscillating said arms so that said blades alternately perform their cutting actions to form a trench, and means for laying said flexible element in the trench successively cut by said blades.

12. The machine defined in claim 11 including an engine on said frame means, a pump driven by said engine, and a hydraulic motor for rotating said eccentric means.

13. The machine defined in claim 12 including a lift mechanism supported on said frame means and hydraulic means for raising and lowering said lift mechanism, said arms being pivotally connected to said lift mechanism.

14. The machine defined in claim 13 in which said lift mechanism is pivotally connected to said frame means so thaat said blades which extend downwardly from said arms traverse an arcuate path into the ground when said lift mechanism is lowered.

15. The machine defined in claim 14 including means attached to said second blade for pulling the flexible element to be buried.

16. The machine defined in claim 14 including means depending from said lift mechanism for feeding said flexible element behind said second blade.

* * * * *